(12) United States Patent
Hooli et al.

(10) Patent No.: US 8,451,787 B2
(45) Date of Patent: May 28, 2013

(54) ALLOCATION OF PREAMBLE SEQUENCES

(75) Inventors: Kari Juhani Hooli, Oulu (FI); Juha Korhonen, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 352 days.

(21) Appl. No.: 12/680,930

(22) PCT Filed: Jun. 5, 2008

(86) PCT No.: PCT/EP2008/056979
§ 371 (c)(1),
(2), (4) Date: Apr. 15, 2010

(87) PCT Pub. No.: WO2009/043610
PCT Pub. Date: Apr. 9, 2009

(65) Prior Publication Data
US 2010/0222067 A1    Sep. 2, 2010

(30) Foreign Application Priority Data
Oct. 2, 2007   (EP) .................................... 07117750

(51) Int. Cl.
*H04W 72/04*   (2009.01)
(52) U.S. Cl.
USPC .......................................... 370/329; 455/450
(58) Field of Classification Search
USPC ....................................................... 370/329
See application file for complete search history.

(56) References Cited

U.S. PATENT DOCUMENTS

| | | | |
|---|---|---|---|
| 6,377,618 B1 | 4/2002 | Prasad et al. | 375/225 |
| 2007/0211762 A1 | 9/2007 | Song et al. | 370/490 |
| 2007/0217362 A1 | 9/2007 | Kashima et al. | 370/330 |
| 2007/0230600 A1* | 10/2007 | Bertrand et al. | 375/260 |
| 2008/0075184 A1* | 3/2008 | Muharemovic et al. | 375/260 |
| 2008/0235314 A1* | 9/2008 | Lee et al. | 708/426 |

FOREIGN PATENT DOCUMENTS

JP    2004253899 A    9/2004

OTHER PUBLICATIONS

3GPP TSG RAN1#46, R1-062066, Tallinn, Estonia, Aug. 28-Sep. 1, 2006, "Preamble Sequence Design for Non-Synchronized Random Access", 4 pgs.
TSG-RAN WG1 Meeting #47bis, R1-070189, Sorrento, Italy, Jan. 15-19, 2007, "Zadoff-Chu sequence allocation on RACH for complexity reduction", 4 pgs.
EP Search Report for EP Patent Application No. 07117750.5 mailed Jun. 27, 2012.
RU Office Action for RU Patent Application No. 2010117380/07(024743) mailed Apr. 25, 2012.
CN Office Action for CN patent Application No. 2010-527370 mailed May 31, 2012.
Group-based Re-ordering of ZC sequences in RACH, 3GPP TSG RAN WG1 #50 meeting, R1-073595, XP 50107194, 8 pages.
Preamble index mapping for non-synchronized RACH, 3GPP TSG RAN WG1 meeting #50, R1-073501, XP 50107107, 4 pages.

(Continued)

*Primary Examiner* — Brian D Nguyen
(74) *Attorney, Agent, or Firm* — Harrington & Smith

(57) ABSTRACT

A set of specific sequences including a set of root sequences and cyclic shifts thereof is searched, wherein it is started from a root sequence index indicating a root sequence of ordered root sequences, available cyclic shifts of the root sequence are included, and it is continued with a next root sequence if necessary for filling the set, interpreting the ordered root sequences in a cyclic manner.

10 Claims, 7 Drawing Sheets

OTHER PUBLICATIONS

3GPP TSG RAN WG1 Meeting #50bis, R1-074340, "Sequence ordering and other RACH issues", Shanghai, China, Oct. 2007, 5 pages.

3GPP TSG RAN WG1 #50bis R1-074148, "Cyclic Shift Configuration and Sequence Ordering in Support of High-Speed Random Access", Shanghai, China, Oct. 2007, 6 pages.

3GPP TSG RAN WG1 Meeting #50bis, R1-074421, "PRACH sequence index ordering", Shanghai, China, Oct. 2007, 5 pages.

3GPP TSG RAN WG1 Meeting #50 R1-073836 Panasonic, NTT DoCoMo Athens, Greece, Aug. 20-24, 2007 Title: RACH sequence allocation and indication to the cell, 10 pages.

* cited by examiner

ALLOCATION OF PREAMBLE SEQUENCES

FIELD OF THE INVENTION

The present invention relates to allocation of preamble sequences for an access procedure in a mobile communication system. In particular, the invention relates to allocation of preamble sequences for a random access in E-UTRAN (Evolved UMTS (Universal Mobile Telecommunications System) Terrestrial Radio Access Network).

BACKGROUND OF THE INVENTION

The random access procedure of E-UTRAN resembles that of WCDMA (Wideband Code Division Multiple Access). In both systems, in a first step a user equipment (UE) transmits a preamble on an access slot. A number of different preamble sequences have been defined for the UE to select for the preamble transmission. For E-UTRAN, so called Zadoff-Chu sequences have been chosen. The length of a sequence is 839 samples, which means that 838 root sequences are available. Depending on the cell range which defines delay uncertainty, up to 64 cyclically shifted sequences are obtained from a root sequence.

In E-UTRAN FDD (Frequency Division Duplex) system, 64 preamble sequences are allocated for each cell. In order to minimize system information, only a root sequence index u0 and a cyclic shift increment Ncs and a mobility parameter are broadcasted for UEs of a cell. The UEs form a complete set of 64 sequences by determining available cyclic shifts of the sequence u0 and continuing from the consecutive root sequences until the 64 sequences are collected.

This selected sequence allocation system means that it is required to define an order of the root sequences. The ordering should be decided taking into account two issues.

The first issue is that the cubic metric (CM) of the sequences varies depending on the root sequence index. CM is important because it defines the power back-off that is needed for reaching a certain level of adjacent channel interference when a typical nonlinear transmitter of a UE is assumed. When CM is high, UE cannot transmit with as high mean power as in case of low CM. This means that the coverage (i.e. the supportable cell radius) varies depending on the root sequence. Then it would be preferable to order the root sequences according to CM so that the consecutive root sequences (that are allocated to the same cell) would support roughly the same cell size.

The second issue to consider is that a so called sequence restriction scheme may completely deny utilization of a root sequence or at least some of its cyclic shifts. The restriction scheme is needed because of the special properties of the Zadoff-Chu sequences in case of large frequency offsets, and the scheme will be applied in cells where UEs can move with high speeds. In the following, such cells are called high mobility cells, and the other cells, where restrictions are not applied, are called low mobility cells. A mobility parameter of the System Information indicates if the restrictions are in use. The restrictions define a maximum supportable cell size for each root sequence. If the sequences are ordered according to the maximum supportable size of a high mobility cell, the reuse of the sequences can be optimized in presence of both high and low mobility cells: Those root sequences that are not available in high mobility cells of a certain size form a set of consecutive sequences that can be effectively allocated for low mobility cells.

The two ordering systems, according to CM and according to the maximum size of high mobility cell, are contradicting: sequences with nearly equal CM may support completely different sizes of high mobility cell.

SUMMARY OF THE INVENTION

The present invention aims at enabling a more flexible sequence allocation where both criteria of sequence ordering are taken into account.

According to the invention, this is achieved by devices and methods as set out in the appended claims. The invention can also be implemented as computer program product.

According to an exemplary embodiment of the invention, sequence allocation in cyclic manner is proposed. This enables a more flexible sequence allocation which—depending on the sequence ordering and allocation scheme—may lead to a larger reuse factor, i.e. an additional set of preambles for allocation in the network.

In addition, UE implementation is simplified since an error case that UE needs a sequence consecutive to 838 is eliminated.

According to another exemplary embodiment of the invention, a root sequence ordering scheme is proposed that includes the steps: (1) dividing sequences in two groups according to CM, (2) segmenting the sequences in both of the groups according to the supported size of high mobility cells or segmenting only the high CM group according to supported size of high mobility cells, and (3) ordering the sequences in the segments according to CM. This ordering scheme allows simple and effective allocation as those low CM sequences that provide equal and maximal radio coverage can be allocated over a continuous set of sequences. On the other hand, allocation of high CM sequences can be done taking into account the differences of the radio coverage of the sequences.

For the purpose of the present invention to be described herein below, it should be noted that

- a device may for example be any device by means of which a user may access a communication network; this implies mobile as well as non-mobile devices and networks, independent of the technology platform on which they are based; only as an example, it is noted that terminals operated according to principles standardized by the 3$^{rd}$ Generation Partnership Project 3GPP and known for example as UMTS terminals are particularly suitable for being used in connection with the present invention;
- a device can act as a client entity or as a server entity in terms of the present invention, or may even have both functionalities integrated therein;
- method steps likely to be implemented as software code portions and being run using a processor at one of the server/client entities are software code independent and can be specified using any known or future developed programming language;
- method steps and/or devices likely to be implemented as hardware components at one of the server/client entities are hardware independent and can be implemented using any known or future developed hardware technology or any hybrids of these, such as MOS, CMOS, BiCMOS, ECL, TTL, etc, using for example ASIC components or DSP components, as an example;
- generally, any method step is suitable to be implemented as software or by hardware without changing the idea of the present invention;
- devices can be implemented as individual devices, but this does not exclude that they are implemented in a distrib-

DESCRIPTION OF THE EMBODIMENTS OF THE INVENTION

Figure 1:
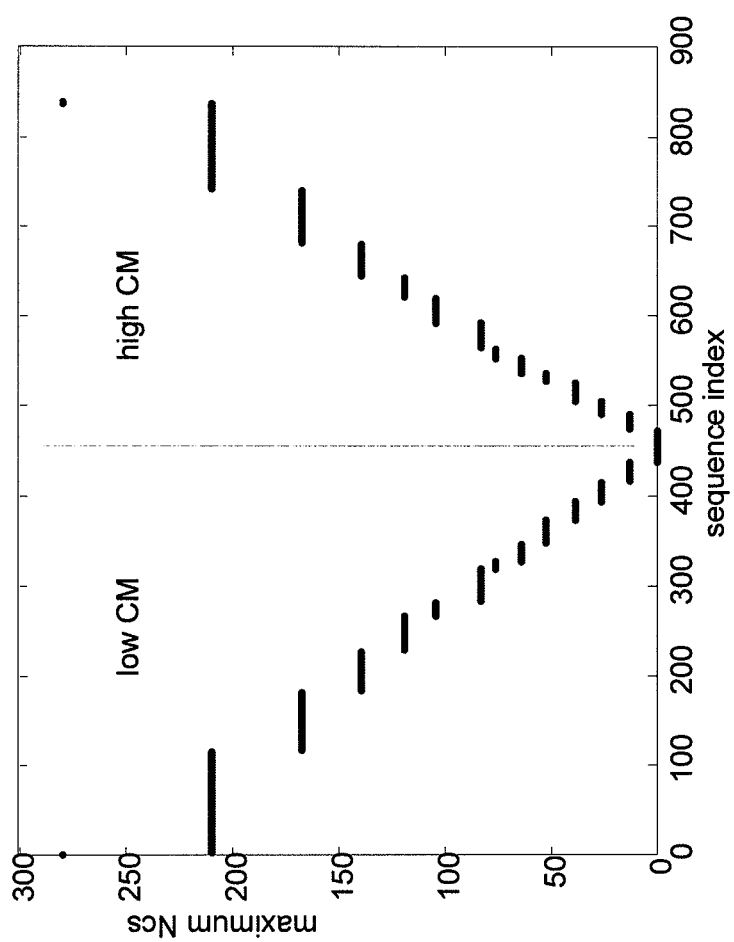
FIG. 1 shows a diagram illustrating segmenting of sequences according to a first ordering scheme of root sequences.

In a first ordering scheme shown in FIG. 1, sequences are first ordered according to increasing CM. The sequences are then divided into two sets with CM below or above a predetermined threshold, e.g. the CM of QPSK (Quadrature Phase Shift Keying) modulation. CM of QPSK is an appropriate point of comparison because it is the lowest order modulation used in E-UTRAN for user data transmission.

Finally the sequences in the low CM set are ordered according to a decreasing supported size of high mobility cell while the sequences in the high CM set are ordered according to an increasing supported size of high mobility cell. FIG. 1 shows the maximum supported cyclic shift increment Ncs as a function of the sequence index when the first ordering scheme is adopted. The maximum Ncs is proportional to the maximum cell size. As an example, Ncs has been quantized to 15 values 13, 26, 38, 52, 64, 76, 83, 104, 119, 139, 167, 209, 279, 419, 839. The sequence indexes whose maximum Ncs=0 can be allocated only in low mobility cells. The dashed line is a CM boundary dividing the sequences into low and high CM sets.

Figure 2:
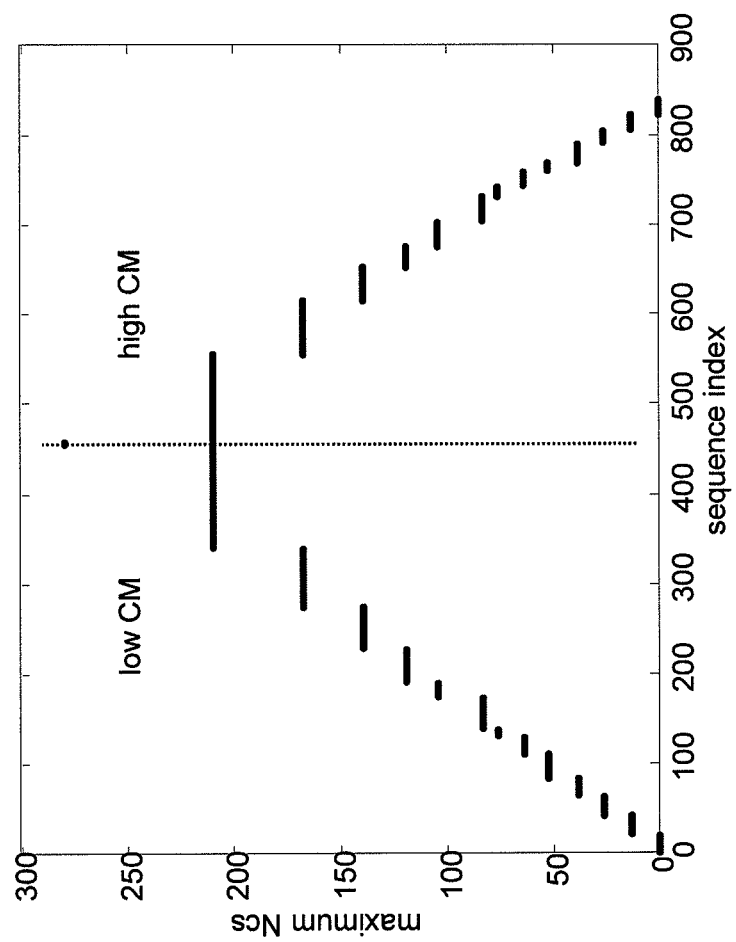
FIG. 2 shows a diagram illustrating segmenting of sequences according to a second ordering scheme of root sequences.

With a modification to the first ordering scheme, the ordering as shown in FIG. 2 is obtained. In order to obtain the second ordering scheme as shown in FIG. 2, the high and low CM sets are formed as described above, but the low CM set is ordered according to the increasing supported size of high mobility cell and the high CM set is ordered according to the decreasing supported size of high mobility cell.

FIG. 2 shows the maximum cyclic shift increment Ncs as a function of the root sequence index when the sequences are ordered with the second ordering scheme. The maximum Ncs is proportional to the cell size. The possible Ncs values have been quantized to 15 values. The sequence indexes whose maximum Ncs=0 can be allocated only in low mobility cells. The dashed line is a CM boundary dividing the sequences into low and high CM sets.

In case sequence allocations are needed for both the low and high mobility cells, the schemes of FIGS. 1 and 2 are equivalent only if the sequences of one cell are never obtained across the CM boundary. However, the sequence allocation over the CM boundary is desirable because that would bring flexibility and would in some cases also allow additional sets of the 64 sequences.

The schemes of FIGS. 1 and 2 are different if flexible allocation over the CM boundary is considered. In the scheme of FIG. 1 allocation over the CM boundary can be made flexibly only for the low mobility cells, while in the scheme of FIG. 2 the flexible allocation over the CM boundary is possible only for the sequences supporting large high mobility cells.

Figure 3:
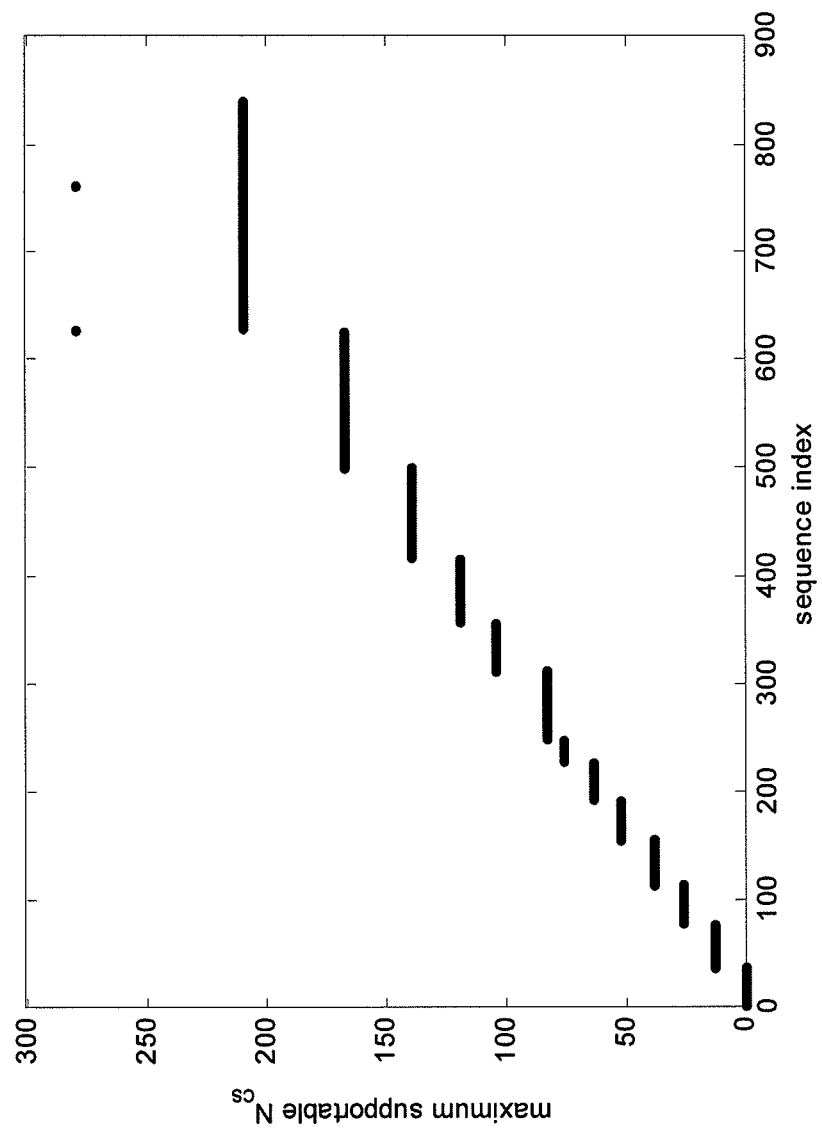
FIG. 3 shows a diagram illustrating segmenting of sequences according to a third ordering scheme of root sequences.
Figure 4:
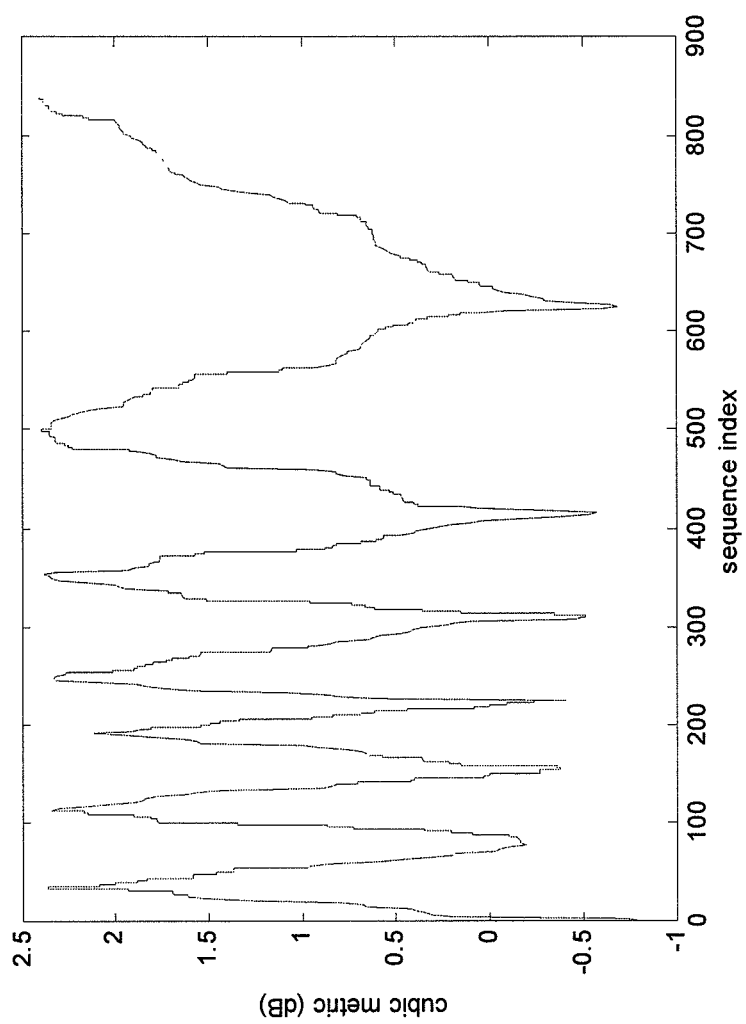
FIG. 4 shows a diagram illustrating CM of sequences in the third ordering scheme of root sequences.

According to a third ordering scheme, shown in FIG. 3, the sequences are first segmented according to the supported size of the high mobility cell. For instance, if the possible Ncs values were as assumed in the scheme of FIG. 1, a first set could include sequences that support cell sizes corresponding to Ncs=12 or smaller. The second set could comprise sequences supporting cell sizes up to Ncs=25 but not larger, and so on. Forming a segment corresponding to each specified Ncs value is just an example. For instance, in FIG. 3, the sequences whose maximum Ncs is 209 or 279 form one set. The sequences of each set are then ordered according to CM. A preferable way is to order every other set with CM decreasing and every other set with CM increasing. This leads to CM configuration as shown in FIG. 4.

First Embodiment

According to the first embodiment, sequence allocation is made cyclic. According to an E-UTRAN system, a UE forms a set of 64 sequences by starting from a broadcasted sequence u0 and using the consecutive sequences as needed. Sequence number one is considered to be consecutive to the sequence number 838.

Figure 5:
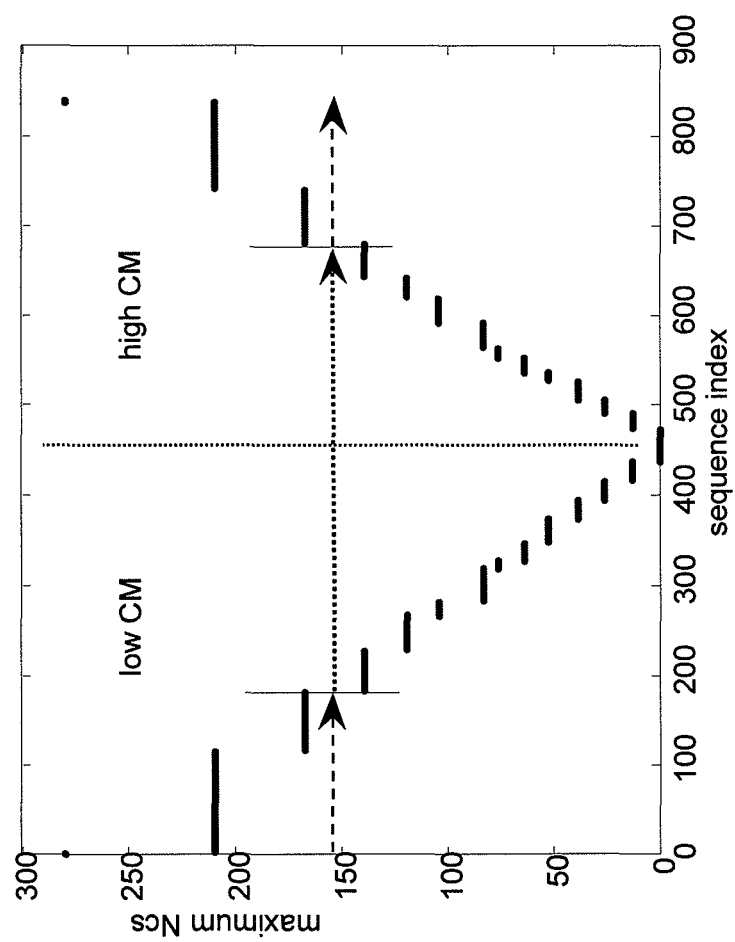
FIG. 5 shows a diagram illustrating segmenting of sequences according to an ordering scheme of root sequences according to an exemplary embodiment of the invention.

The first embodiment is described by referring to FIG. 5. The first ordering scheme as shown in FIG. 1 is adopted. A desired division of sequences between high and low mobility cells may be made e.g. as shown by the lines with the arrow heads: Dashed lines mark the sequences that are reserved for allocation in the high mobility cells while sequences marked with a dotted line are reserved for low mobility cells. How large these reserved sequence sets should be, depends on the number of high mobility cells relative to the low mobility cells and the cell size. Let us also assume that Ncs is below 167. Without the cyclic allocation, the sequences reserved for high mobility cells would form two disconnected sets and the root sequences allocated for one high mobility cell would be collected either from the low CM group or from the high CM group. Defining cyclic allocation joins all the sequences that are reserved for high mobility cells: for instance u0=838 could be allocated to a high mobility cell because the 64 sequences would then be collected from the root sequences 838, 1, 2, . . . . Without cyclic allocation, the sequence number 838 and, depending on Ncs, some other sequences with large index would not do for u0. In summary, according to the first embodiment the two sequence sets marked with the dashed lines are joined according to the cyclic allocation, for allocations over the CM boundary.

The cyclic allocation is useful also if sequence ordering scheme of FIG. 2 is in use because u0 value 838 and values close to that are not be possible except in very small cells where the 64 sequences can be collected from a single or a few root sequences.

Thus, with the first embodiment allocation of the sequences across the CM boundary is possible both for the sequences supporting large high mobility cells and the sequences that can be used only in low mobility cells.

The first embodiment simplifies the sequence allocation by allowing the root sequences number 838 and 1 to be allocated in the same cell. This flexibility may in some cases lead to an additional set of 64 sequences if the sequences are ordered as in the first or second ordering schemes shown in FIGS. 1 and 2.

The first embodiment does not complicate implementation of UE or base station in any way. The first embodiment actually simplifies implementation of the UE because it removes the error case that UE would not have 64 sequences after including all the cyclic shifts of the sequence number 838.

Figure 6:
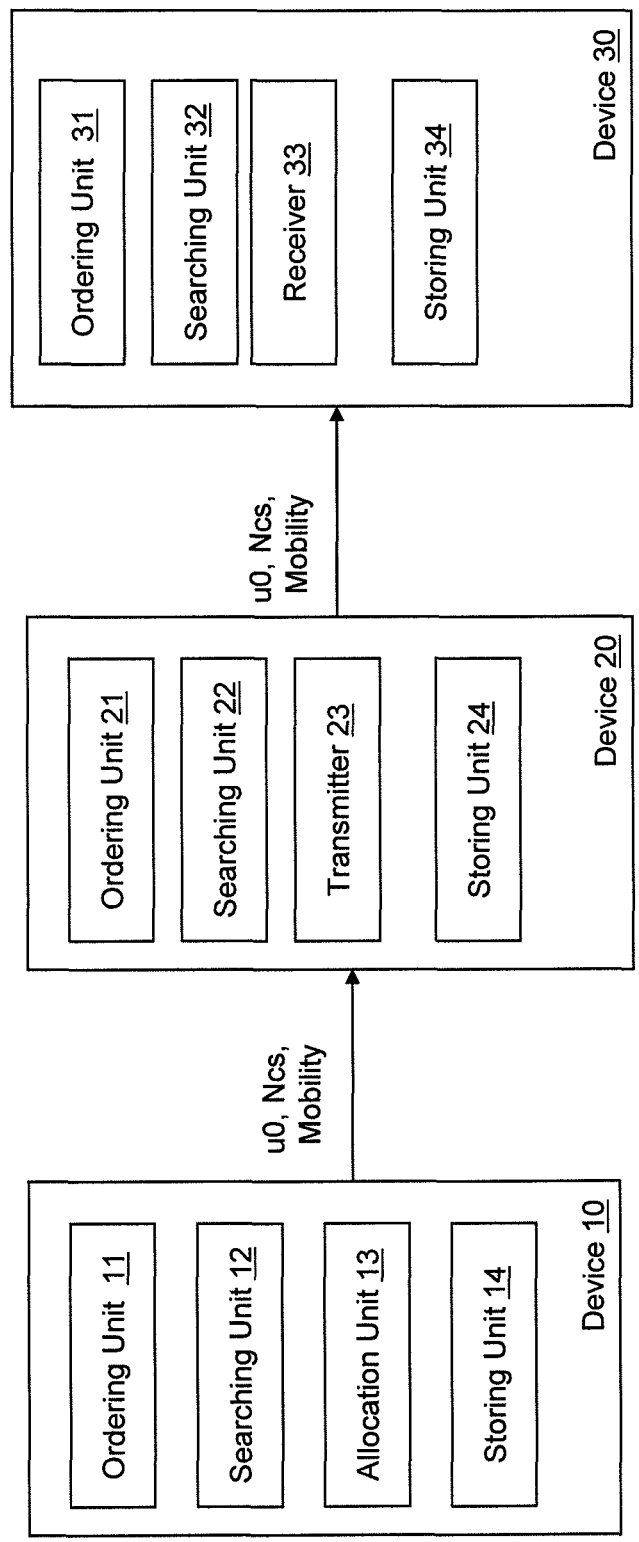
FIG. 6 shows a schematic block diagram illustrating a structure of devices according to an exemplary embodiment of the invention.

FIG. 6 shows a schematic block diagram illustrating a network controlling device 10, a device 20 which may act as base station and a device 30 which may act as user equipment according to the first embodiment.

Each of the devices 10, 20, 30 comprises a searching unit 12, 22, 32 which searches specific sequences based on a root sequence index u0 indicating a root sequence of ordered sequences, a cyclic shift increment of the root sequence Ncs and a mobility parameter "Mobility" from the ordered sequences.

The ordered sequences may be generated by an ordering unit 11, 21, 31 which may be provided in each of the devices 10, 20, 30. The ordering unit 11, 21, 31 may generate the ordered sequences after every boot up of the device 10, 20, 30. Alternatively, the ordering unit can be replaced by a permanent memory (storage unit) 14, 24, 34 in which the sequence order needs to be loaded only once or during possible software updates.

According to the first embodiment, the ordered sequences are obtained by dividing sequences of predetermined length and number into a first set comprising first sequences and a second set comprising second sequences in accordance with a cubic metric of each of the sequences below or above a predetermined threshold, and ordering the first sequences in accordance with a supported size of a high mobility cell supported by each of the first sequences and complementarily ordering the second sequences in accordance with the supported size of the high mobility cell supported by each of the second sequences.

The cubic metric of each of the first sequences may be below the predetermined threshold and the cubic metric of each of the second sequences may be above the predetermined threshold. The ordering unit 11 may order the first sequences in accordance with the supported size of the high mobility cell decreasing and the second sequences in accordance with the supported size of the high mobility cell increasing as shown in FIG. 1 or vice versa as shown in FIG. 2.

The specific sequences searched by the searching unit 12, 22, 32 may comprise a set of root sequences and cyclic shifts thereof. The searching unit 12, 22, 32 starts the search of suitable root sequences from a sequence indicated by the root sequence index u0, including consecutive root sequences if needed, interpreting the order of the root sequences, i.e. the root sequence order, cyclic.

The device 10 may further comprise an allocation unit 13 which decides the root sequence index, the cyclic shift increment and the mobility parameter based on a required supported size of a cell in a communications network and a required cubic metric. The mobility parameter may be a binary parameter, wherein Mobility=0 means low mobility cell, and Mobility=1 means high mobility cell.

The transmission of information between the devices 10, 20, 30 is minimized if only the indication of a root sequence (root sequence index) u0, a cyclic shift increment Ncs and a mobility parameter are sent from device 10 to device 20 and further to device 30. The connection between device 20 and 30 is an air-interface, and device 20 includes a transmitter 23 that transmits u0, Ncs and the mobility parameter as a part of the System Information. A receiver 33 of device 30 receives u0, Ncs and the mobility parameter.

It is to be noted that the devices shown in FIG. 6 may have further functionality for working e.g. as network controlling device, base station and user equipment. Here the functions of the devices relevant for understanding the principles of the invention are described using functional blocks as shown in FIG. 6. The arrangement of the functional blocks of the devices is not construed to limit the invention, and the functions may be performed by one block or further split into sub-blocks.

Second Embodiment

Figure 7:
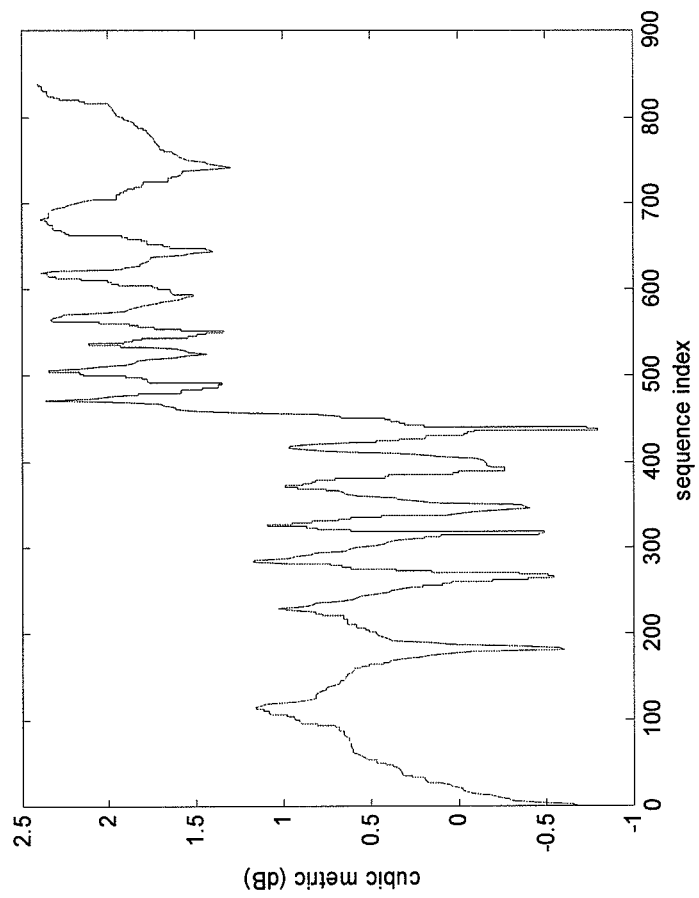
FIG. 7 shows a diagram illustrating CM of sequences in an ordering scheme according to an exemplary embodiment of the invention.

The second embodiment proposes a sequence ordering scheme that combines the first and third ordering schemes or the second and third ordering schemes. First the low and high CM sets are formed as shown in FIG. 1 or 2. Then the third ordering scheme is applied separately to the low and high CM sets or at least to the high CM set: Subsets are formed according to the supported cell size and the sequences inside each subset are ordered according to the CM. The resulting CM configuration is shown in FIG. 7 for the case that the first and the third ordering schemes are combined and subsets are formed for both low and high CM sets.

The second embodiment combines benefits of the first and third ordering schemes. CM defines the power back-off that UE has to apply in order to maintain low enough interference level on the adjacent channels: if CM is large, the UE has to lower its mean transmission power. On the other hand, if CM is low, the UE could transmit with higher mean power without exceeding the limits of the adjacent channel interference. However, the UE cannot exceed the 24 dBm maximum mean power which the UE should support when transmitting a QPSK signal. In other words, even if the CM of a sequence is below the CM of QPSK, the UE will not be able to transmit it with a power larger than 24 dBm. The sequences with CM less than CM of QPSK can then be freely ordered according to the cell size criterion as done in the first ordering scheme because all these sequences can be transmitted with the same maximum power. However, in the first ordering scheme also the sequences whose CM is larger than CM of QPSK are ordered only according to the cell size criterion. The differences in CM cannot then be fully utilized in this group because the consecutive sequences can have quite different CM values. If this group is ordered using the third ordering scheme, the consecutive sequences inside a subset have roughly the same CM, i.e. they can be transmitted with nearly the same maximum mean power (the same power back-off is needed). A disadvantage of the third ordering scheme is that the subsets are dividing the sequences with low CM into disjoint sets which is not optimal for sequence allocation. Treating the low CM sequences separately minimizes the effect of this disadvantage. As mentioned above, no coverage gain can be obtained even if the third ordering scheme was applied to the low CM set. However, a very minor possibility for UE's battery power saving might justify ordering also the low CM set with the third ordering scheme. If CM is below the CM of QPSK, UE can at least in principle tune its power amplifier more nonlinear, which would mean saving battery power.

Referring to FIG. 6, the ordering unit 11, 21, 31 of device 10, 20, 30 divides sequences of predetermined length and number into a first set comprising first sequences and a second set comprising second sequences in accordance with a cubic metric of each of the sequences below or above a predetermined threshold, orders the first sequences in accordance with a supported size of a high mobility cell supported by each of the first sequences, divides the second sequences into subsets in accordance with the supported size of the high mobility cell supported by each of the second sequences and orders the second sequences inside each of the subsets in accordance with the cubic metric of each of the second sequences, thereby obtaining ordered sequences. In an alternative scheme, also the first sequences are divided into subsets in accordance with the supported size of the high mobility cell supported by each of the first sequences and the sequences inside a subset are ordered according to CM.

The cubic metric of each of the first sequences may be below the predetermined threshold and the cubic metric of each of the second sequences may be above the predetermined threshold. The ordering unit 11, 21, 31 may order the first sequences in accordance with the supported size of the high mobility cell decreasing.

The searching unit 12, 22 and 32 searches in the thus ordered sequences. The ordering unit 11, 21, 31 may generate the ordered sequences after every boot up of the device 10, 20, 30. Alternatively, the ordering unit can be replaced by the permanent memory (storage unit) 14, 24, 34 in which the sequence order needs to be loaded only once or during possible software updates.

The specific sequences searched by the searching unit 12, 22, 32 may comprise a set of root sequences and cyclic shifts thereof. The searching unit 12, 22, 32 starts the search of suitable root sequences from a sequence indicated by the root sequence index u0, including consecutive root sequences if needed.

The second embodiment does not add complexity of devices 10, 20, 30 compared with the first to third ordering schemes. If sequences are ordered according to the cell size criterion, an implementation is to store the sequence order in the permanent memory of the UE. Then all the ordering schemes have equal complexity.

It is to be understood that CM is just an example of a property quantifying the need of the power back-off. The invention is applicable as such if any other measure, like peak-to-average power ratio, is used instead of CM to relate a power back-off value to a root sequence.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A device comprising:
a searching unit configured to search a set of specific sequences, comprising a set of root sequences and cyclic shifts thereof, wherein the searching unit is configured to start from a root sequence index indicating a root sequence of ordered root sequences, include available cyclic shifts of the root sequence, and continue with a next root sequence if necessary for filling the set, interpreting the ordered root sequences in a cyclic manner.

2. The device of claim 1, wherein the ordered root sequences are obtained by ordering sequences of a predetermined length and number in accordance with cubic metric of each of the sequences and a size of a high mobility cell each of the sequences supports.

3. The device of claim 2, wherein the ordered root sequences are obtained by dividing the sequences of predetermined length and number into a first set comprising first sequences and a second set comprising second sequences in accordance with a cubic metric of each of the sequences below or above a predetermined threshold, and ordering the first sequences in accordance with a supported size of a high mobility cell supported by each of the first sequences and complementarily ordering the second sequences in accordance with the supported size of the high mobility cell supported by each of the second sequences.

4. The device of claim 3, wherein the cubic metric of each of the first sequences is below the predetermined threshold and the cubic metric of each of the second sequences is above the predetermined threshold, and the first sequences are ordered in accordance with the supported size of the high mobility cell decreasing and the second sequences are ordered in accordance with the supported size of the high mobility cell increasing or vice versa.

5. A method comprising:
searching a set of specific sequences, comprising a set of root sequences and cyclic shifts thereof, wherein the searching comprises:
starting from a root sequence index indicating a root sequence of ordered root sequences,
including available cyclic shifts of the root sequence; and
continuing with a next root sequence if necessary for filling the set, interpreting the ordered root sequences in a cyclic manner.

6. The method of claim 5, wherein the ordered root sequences are obtained by ordering sequences of a predetermined length and number in accordance with cubic metric of each of the sequences and a size of a high mobility cell each of the sequences supports.

7. The method of claim 6, wherein the ordered root sequences are obtained by dividing the sequences of predetermined length and number into a first set comprising first sequences and a second set comprising second sequences in accordance with a cubic metric of each of the sequences below or above a predetermined threshold, and ordering the first sequences in accordance with a supported size of a high mobility cell supported by each of the first sequences and complementarily ordering the second sequences in accordance with the supported size of the high mobility cell supported by each of the second sequences.

8. The method of claim 7, wherein the cubic metric of each of the first sequences is below the predetermined threshold and the cubic metric of each of the second sequences is above the predetermined threshold, and the first sequences are ordered in accordance with the supported size of the high mobility cell decreasing and the second sequences are ordered in accordance with the supported size of the high mobility cell increasing or vice versa.

9. A computer program product comprising a computer-readable storage medium including a program for a processing device, comprising software code portions for performing the steps of claim 5 when the program is run on the processing device.

10. The computer program product according to claim 9, wherein the program is directly loadable into an internal memory of the processing device.

* * * * *